April 8, 1930.  L. MAMBOURG  1,753,749
SHEET GLASS EDGE FORMING MEANS
Filed May 29, 1925   2 Sheets-Sheet 1

INVENTOR.
Leopold Mambourg
Frank Fraser,
ATTORNEY.

April 8, 1930. L. MAMBOURG 1,753,749
SHEET GLASS EDGE FORMING MEANS
Filed May 29, 1925  2 Sheets-Sheet 2
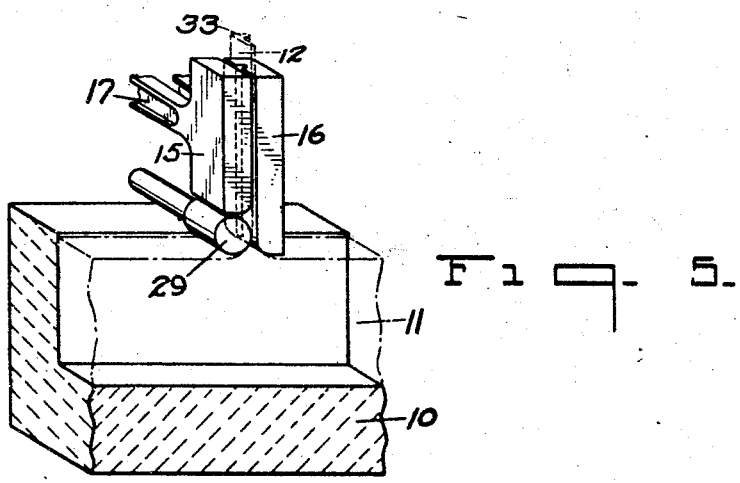
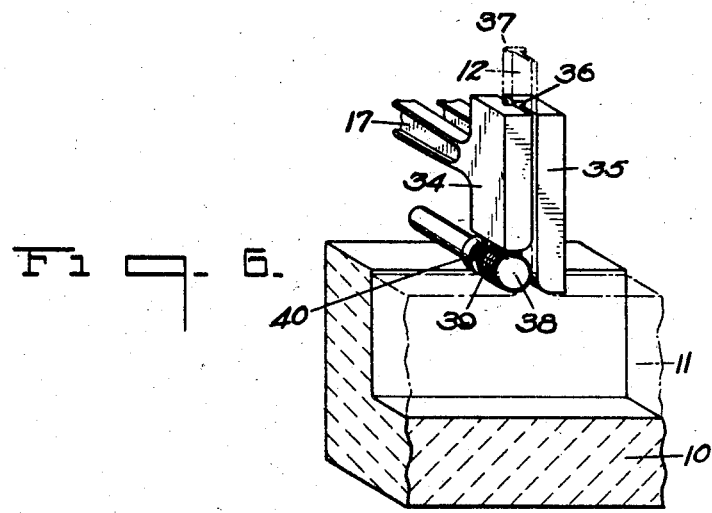
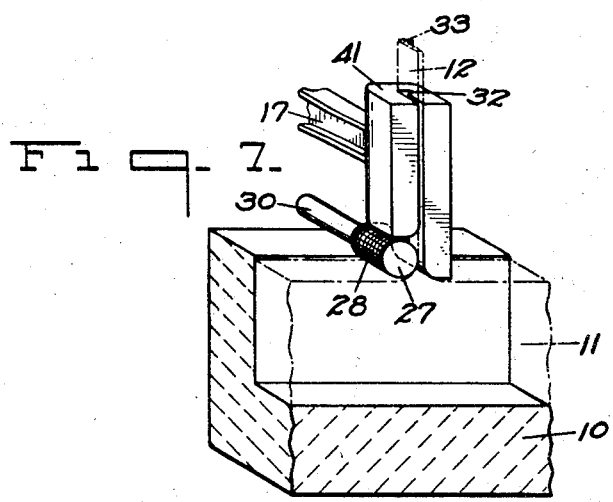
INVENTOR.
Leopold Mambourg.
Frank Fraser
ATTORNEY.

Patented Apr. 8, 1930

1,753,749

UNITED STATES PATENT OFFICE

LEOPOLD MAMBOURG, OF LANCASTER, OHIO, ASSIGNOR TO LIBBEY-OWENS GLASS COMPANY, OF TOLEDO, OHIO, A CORPORATION OF OHIO

SHEET-GLASS EDGE-FORMING MEANS

Application filed May 29, 1925. Serial No. 33,708.

The present invention relates to sheet glass apparatus, and has particular reference to sheet glass edge forming means.

An important object of the invention is to provide an apparatus for continuously drawing a sheet of glass from a mass of molten glass, and has particular reference to the provision of sheet edge engaging means for guiding the edges of the sheet being drawn to prevent narrowing of the said sheet.

Another object of the invention is to provide a sheet glass drawing apparatus, and means for guiding the edges of the sheet being drawn in a manner to create a beaded edge and to hold the beaded edge past a point where the edge will be sufficiently strong to overcome the natural tendencies of the sheet to contract or narrow.

Still another object of the invention is to provide sheet glass edge forming means wherein guide members are arranged at both edges of the sheet and are each provided with a rotatable member for positively advancing glass through the guide means, the same being so shaped as to create a beaded edge.

Other objects and advantages of the invention will become apparent during the course of the following description.

Figure 1:
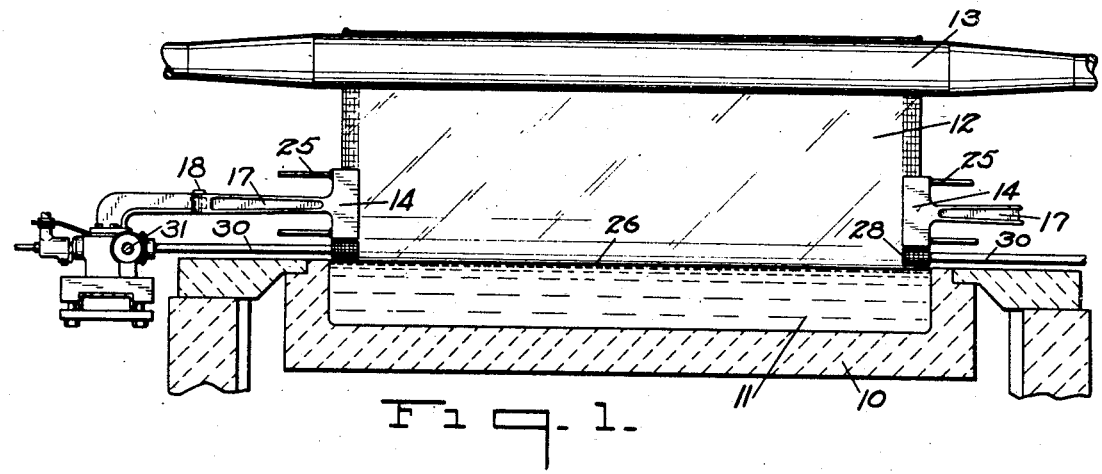
Figure 2:
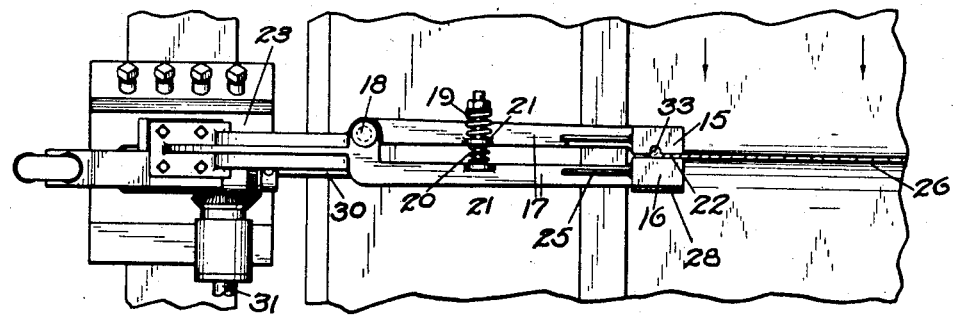
Figure 4:
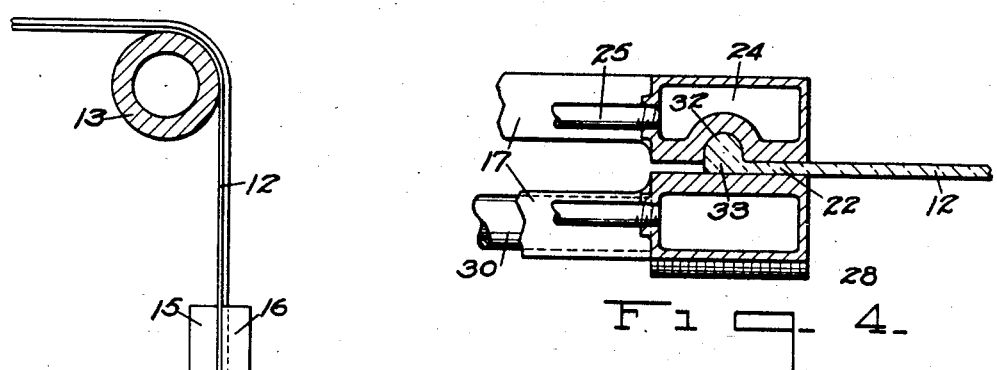
Figure 3:
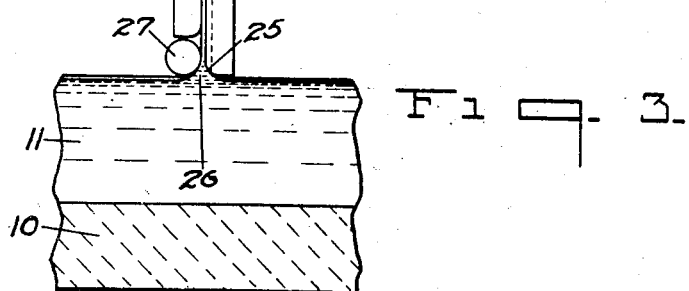

In the drawings wherein like numerals are employed to designate like parts throughout the same, Fig. 1 is a transverse section of a sheet drawing apparatus disclosing my improved construction in use, Fig. 2 is a top plan view thereof, Fig. 3 is a front elevation, Fig. 4 is a transverse horizontal section through the device, Fig. 5 is a perspective view of a slightly modified form, Fig. 6 is a similar view of still another form, and Fig. 7 is a perspective view of one of the devices.

This invention is particularly well-adapted for use in connection with the Colburn machine set forth in Colburn Patent No. 1,248,809, granted December 4, 1917, wherein the draw-pot 10 is provided and is adapted to contain a mass of molten glass 11 from which a sheet 12 may be drawn. In this patent a sheet of glass is adapted to be deflected over a bending member 13, after which it may be handled in any desirable manner.

The Colburn machine utilizes a pair of rotatable knurl rolls at both edges of the sheet which create what is known in the art as a knurled edge, the said knurled edge being formed by the rolls for the purposes of preventing or overcoming the natural tendencies of the sheet to narrow. These rolls are placed at the sheet source or meniscus and form a relatively thick heavy edge on the sheet which usually extends seven or eight inches in toward the body of the sheet. When trimming the sheet for commercial purposes, it is necessary to remove this heavy knurled edge and thus the net width of the sheet is considerably less than the gross width.

The aim of the present invention is to provide sheet edge forming devices which will be fully capable of forming an edge on the sheet, while at the same time the amount of edge glass timmed off will be reduced considerably.

In Fig. 1 is shown one form of device wherein the guide means 14 are formed in two sections as at 15 and 16 in Fig. 2, each section being supported upon an arm 17 pivotally connected as at 18 and normally urged toward each other by means of the resilient spring 19. A safety spring 20 is interposed between bosses 21 on respective arms to hold the guide members or shoes 15 and 16 sufficiently far apart to permit the edge 22 of the sheet to be formed therein. The arms 17 may be arranged upon any suitable adjustable support 23.

The shoes 15 and 16 are preferably formed from a non-corrosive metal such as Monel, nichrome, stellite, etc. and are provided with the internal cavities 24 having connection to a conduit 25 by which means a suitable cooling medium may be circulated therethrough such as air or water. As is clearly shown in Fig. 3, one of the shoes, designated by the numeral 15, is substantially shorter than the shoe 16. The shoe 16 is curved at its lower end as at 25 to adapt the shoe to fit the natural curvature of the sheet supplying meniscus 26. A rotatable roll 27 is adapted to be positioned beneath the base of the shoe 15 and to engage the sheet supplying meniscus 26 in a manner to positively advance molten glass through the said guide means. The rotatable roll 27 may either be knurled as indicated by the roll 28, or smooth as shown in Fig. 5 and indicated by the numeral 29. The roll is supported upon a shaft 30 which has connection with the driving mechanism 31. The speed of rotation of the roll can be adjusted and will vary with the type of sheet being drawn, thus a single strength sheet will require a more rapid rate of speed of the roll than the double strength sheet. The rolls may be internally cooled by any suitable means.

As is shown in Fig. 4, one of the guide members 14 is provided with a groove 32 so that a bead 33 will be created on the edges of the glass, and because of the fact that this bead is pulled through the guide means which are cooled, it will be relatively more viscous than the balance of the sheet, thus being strong enough to overcome the natural tendencies of the sheet to narrow.

It has been found in the Colburn machine that when using the knurled rolls a sharp contraction of the sheet takes place several inches above the knurls. To overcome this noticeable contraction of the sheet with subsequent loss in net width of the finished sheet, the guide shoes 15 and 16 are adapted to contact sufficiently high in the vertical run of the sheet to permit the edge to gain strength capable of overcoming this contraction.

Where the edge is beaded on one side as shown in Fig. 4, it is desirable to have the bead formed on the surface which does not contact with the bending member 13. Of course it is desirable to make the bead 33 as small as possible provided it will prevent narrowing of the sheet and thus the bead will not seriously interfere with the bending of the sheet, but at the same time it is better to have the bead on the upper surface of the sheet as has been pointed out.

In Fig. 6 of the drawings both of the guide members 34 and 35 are provided with grooves 36 so that a double bead 37 will be formed. Thus it will be seen that the construction shown in Fig. 5 will create an L-shaped edge, while the construction shown in Fig. 6 will create a T-shaped edge. In Fig. 6 the rotatable roll 38, which may or may not be provided with the knurling 39, is provided with a grooved portion 40 which is arranged in alignment with the grooves 36 formed in the guide members. This will insure the introduction of sufficient glass between the guide members to form the beaded edge desired.

In Fig. 7 the guide member is formed in an integral structure, thus forming what may be termed a U-shaped guide member 41.

With the construction herein set forth, the edges of the sheet are held within a guiding means until they have gained sufficient strength to overcome the natural tendencies of contraction. At the same time the edge formed will be relatively much thinner than the old type of edge formed. There will be no thick portion extending six or seven inches toward the center of the sheet. By overcoming the contraction of the sheet and reducing the thickened portions a much wider net sheet is produced from the same machine than heretofore.

It it to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass apparatus, a receptacle containing a mass of molten glass, means for drawing a sheet therefrom, a stationary guide member arranged at each edge of the sheet, and a rotatable member in horizontal alignment with a portion of each guide member and cooperating therewith, to assist in advancing glass through said guides.

2. In sheet glass apparatus, a receptacle containing a mass of molten glass, means for drawing a sheet therefrom, a stationary guide member arranged at each edge of the sheet, and a rotatable member disposed beneath a portion of said guide member and in horizontal alignment with another portion thereof to assist in advancing glass through the stationary guide member.

3. In sheet glass apparatus, a receptacle containing a mass of molten glass, means for drawing a sheet therefrom, a stationary guide member arranged at each edge of the sheet, and a rotatable member in vertical alignment with one portion of said guide member and in horizontal alignment with another portion thereof, said rotatable member cooperating with the second mentioned portion of the guide member to assist in advancing glass therethrough.

4. In sheet glass apparatus, a receptacle containing a mass of molten glass, means for drawing a sheet therefrom, guide means arranged at both edges of the sheet, and a roll associated with each guide means, each roll being in horizontal alignment with a portion of its respective guide member and adapted to cooperate therewith for assisting in advancing glass therethrough.

5. In sheet glass apparatus, a receptacle containing a mass of molten glass, means for drawing a sheet therefrom, a width maintaining device disposed at each edge of the sheet, each width maintaining device comprising two sections, and a rotatable member arranged beneath one of said sections and adapted to cooperate with the lower portion of the other section in a manner to assist in advancing glass through said width maintaining device.

6. In sheet glass apparatus, a receptacle containing a mass of molten glass, means for drawing a sheet therefrom, a width maintaining device disposed at each edge of the sheet, each width maintaining device comprising two sections, one section being formed at its lower edge to substantially conform to the natural curvature of the sheet source, the other section terminating in spaced relation to the sheet source, and a rotatable member mounted between the lower edge of the second mentioned section and the sheet source.

7. In sheet glass apparatus, a receptacle containing a mass of molten glass, means for drawing a sheet therefrom, a stationary guide member arranged at each edge of the sheet, and a rotatable member in horizontal alignment with a portion of each guide member and cooperating therewith to assist in advancing glass through said guides, said guide means being shaped to form beaded edges on the sheet being drawn.

8. In sheet glass apparatus, a receptacle containing a mass of molten glass, means for drawing a sheet therefrom, a stationary guide member arranged at each edge of the sheet, and a rotatable member in horizontal alignment with a portion of each guide member and cooperating therewith to assist in advancing glass through said guides, the guide members being of sufficient height to engage the sheet edges past a point where they will be sufficiently strong to resist the natural tendency of the sheet to contract.

9. In sheet glass apparatus, a receptacle containing a mass of molten glass, means for drawing a sheet therefrom, slotted guide means arranged at both edges of the sheet, and a single roll associated with each slotted guide means, each roll cooperating in substantially horizontal alignment with a portion of its respective guide means to assist in advancing the glass through said guide means.

10. In sheet glass apparatus, a receptacle containing a mass of molten glass, means for drawing a sheet therefrom, slotted guide means arranged at both edges of the sheet, and a single roll associated with each slotted guide means, each roll cooperating in substantially horizontal alignment with a portion of its respective guide means to assist in advancing the glass through said guide means, the guide means being formed to engage the sheet edges past a point where they will be sufficiently strong to resist the natural tendency of the sheet to contract.

11. In sheet glass apparatus, a receptacle containing a mass of molten glass, means for drawing a sheet therefrom, slotted guide means arranged at both edges of the sheet, said guide means having one side shorter than the other, and rotatable means disposed beneath the shorter side for assisting in advancing glass to the border portions of the sheet.

12. In sheet glass apparatus, a receptacle containing a mass of molten glass, means for drawing a sheet therefrom, slotted guide means arranged at both edges of the sheet, said guide means having one side shorter than the other, rotatable means disposed beneath the shorter side for assisting in advancing glass to the border portions of the sheet, and means for lowering the temperature of the guide means.

13. In sheet glass apparatus, a receptacle containing a mass of molten glass, means for drawing a sheet therefrom, slotted guide means arranged at both edges of the sheet, said guide means having one side shorter than the other, and rotatable means disposed beneath the shorter side for assisting in advancing glass to the border portions of the sheet, said guide means being shaped to form beaded edges on the sheet being drawn.

14. In sheet glass apparatus, a receptacle containing a mass of molten glass, means for drawing a sheet therefrom, slotted guide means arranged at both edges of the sheet, and a single knurled roll associated with each slotted guide means, each roll cooperating in substantially horizontal alignment with a portion of its respective guide means to assist in advancing the glass through said guide means.

15. In sheet glass apparatus, a receptacle containing a mass of molten glass, means for drawing a sheet therefrom, slotted guide means arranged at both edges of the sheet, and a single roll associated with each slotted guide means, each roll cooperating in substantially horizontal alignment with a portion of its respective guide means to assist in advancing the glass through said guide means, the guide means being formed to engage the sheet edges past a point where they will be sufficiently strong to resist the natural tendency of the sheet to contract, the guide means being shaped to create beaded edges on the sheet.

16. In sheet glass apparatus, a receptacle containing a mass of molten glass, means for drawing a sheet therefrom, slotted means arranged at both edges of the sheet and disposed above the surface of the glass from which the sheet is drawn, one side of said guide means having one end arranged relatively close to the base of the sheet and the other side of said guide means being so disposed that a roll may be arranged between the lower end thereof and the surface of the molten glass to assist in advancing the molten glass through the said guide means.

Signed at Lancaster, in the county of Fairfield, and State of Ohio, this 25th day of May, 1925.

LEOPOLD MAMBOURG.